2,944,616

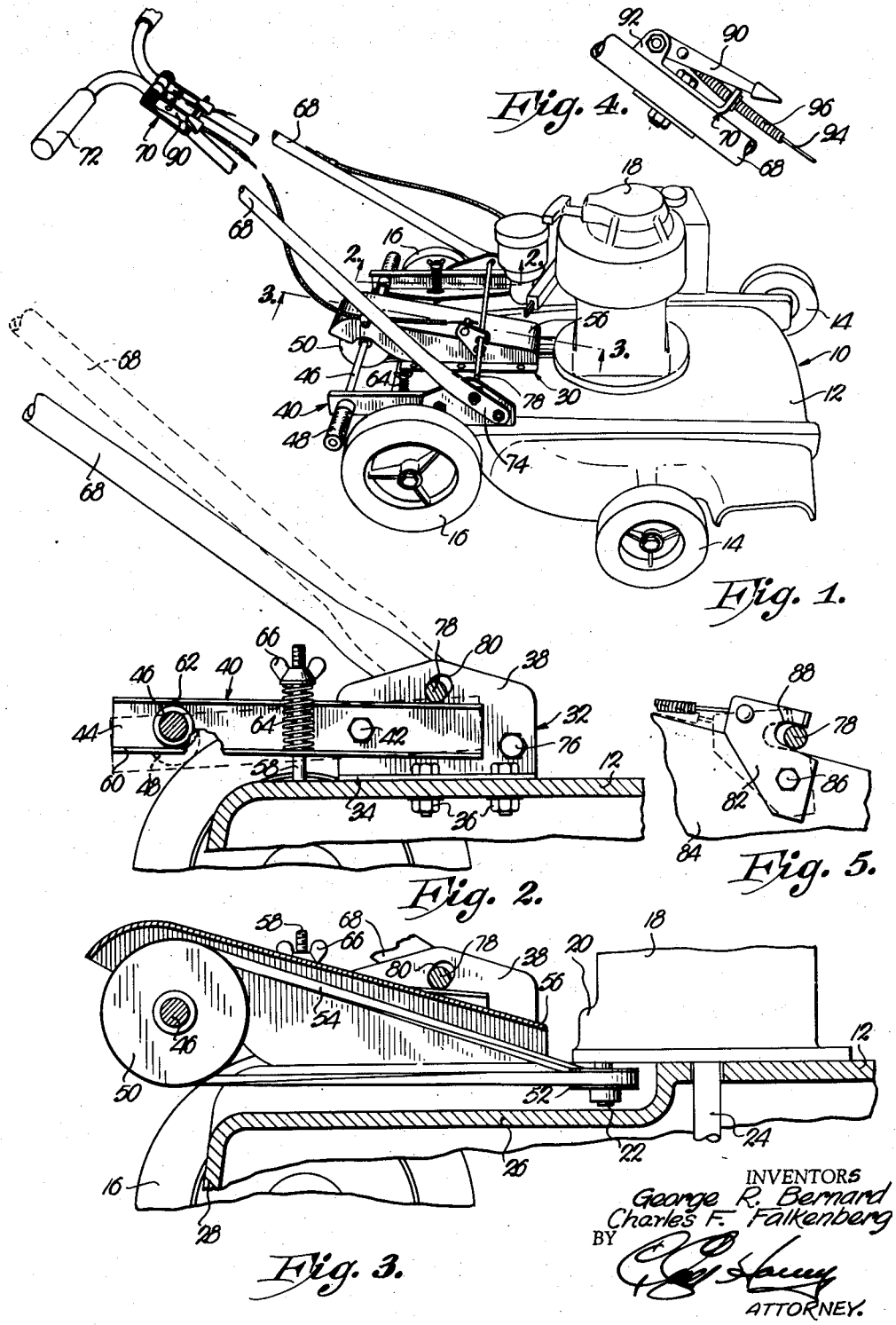

POWER DRIVEN LAWN MOWER

George R. Bernard and Charles F. Falkenberg, Kansas City, Mo., assignors to Lazy Boy Lawn Mower Co., Inc., Kansas City, Mo., a corporation of Missouri Filed Dec. 8, 1958, Ser. No. 778,925

1 Claim. (Cl. 180—19)

This invention relates to power driven lawn mowing equipment and has for its primary object to provide simple and efficient mechanism for propelling the mower from the engine thereof and without it being necessary for the operator to maintain pressure in a predetermined direction on the guide handles of the machine, yet constructed in an improved way to permit instantaneous disconnection of the drive wheels from the engine when desired.

A further very important object of the invention is to provide self-propulsion mechanism for a power operated lawn mower wherein is included means coupled with the engine of the machine and normally biased into engagement with certain of the wheels of the mower to propel the same forwardly, and the guide handles of the machine being connected to the self-propulsion mechanism in a way to disconnect the wheels of the mower from the engine thereof by the simple expedient of lifting upwardly on the guide handles.

Also an important object of the invention is to provide self-propulsion mechanism of the character mentioned above which assures positive connection of the drive wheels of the mower with the engine without the necessity of the operator maintaining pressure against the guide handles of the machine, as has been required with other types of self-propelled mowers.

An additional important object of the invention is to provide lock means on the self-propelled mower permitting selective disengagement of the drive wheels from the mower engine for any length of time and while the engine continues to operate.

Another important object of the invention relates to the provision of a self-propulsion unit for power driven lawn mowers which is particularly adapted to be used with engines of the type having an integral gear reduction assembly forming a part thereof and which are commercially available on the open market, thereby materially saving on the components required in fabrication of the machine and assuring long life thereof because of the way in which the gear reducer assembly is enclosed within a sealed housing. Another object of the invention relates to the provision of a mower utilizing an engine as described above to drive the wheels thereof, wherein the machine housing is provided with a unique configuration to receive a belt operably interconnecting the output shaft of the gear reducer assembly with the drive shaft of the self-propulsion unit and thereby maintaining such belt in a protected position and permitting the self-propulsion components to be disposed in relatively close proximity to the upper face of the mower housing. Still another object involves the provision of a mower of the self-propelled type wherein is included means normally biased into engagement with certain of the wheels of the mower for driving the same and operably coupled with the engine thereof, and wherein is included spring means effecting the required releasable interengagement between the driving mechanism and the wheels with the tension of the spring means being adjustable to thereby assure that the wheels of the machine are rotated by the self-propulsion unit under all conditions, notwithstanding the fact that the outer surface of the wheels may become wet from the grass, thus reducing the coefficient of friction of the outer surface of wheel and assuring firmer interengagement between the driving wheels and the components coupling the same with the engine. Still other important objects and details of construction of the instant lawn mower will become obvious or be explained more fully as the following specification progresses.

In the drawing:

Figure 1 is a perspective view of a power driven lawn mower having improved self-propulsion structure mounted thereon;

Fig. 2 is an enlarged, fragmentary, vertical, cross-sectional view taken substantially on the line 2—2 of Fig. 1 and looking outwardly in the direction of the arrows;

Fig. 3 is also an enlarged, fragmentary, vertical, cross-sectional view taken on the line 3—3 of Fig. 1;

Fig. 4 is an enlarged, fragmentary, side elevational view of the control assembly for the lock member constituting a part of the self-propulsion unit; and Fig. 5 is an enlarged, fragmentary, elevational view of the lock member controlled by the assembly illustrated in Fig. 4, the rod adapted to be engaged by the lock member being shown in section.

A self-propelled lawn mower broadly designated 10 in the drawing includes a downwardly opening housing 12 supported by a pair of transversely offset front wheels 14 as well as a pair of rear drive wheels 16 mounted on housing 12 for rotation on a common horizontal axis. Engine 18 mounted on housing 12 centrally thereof and disposed with the drive shaft of the same (not shown) extending downwardly through the upper wall of housing 12 to a position adapted to receive a horizontally rotatable cutter blade (not shown), is conventional in construction and available on the open market. It is to be preferred that engine 18 have an integral gear reducer assembly 20 thereon and including a downwardly projecting output shaft 22 parallel with the main shaft 24 of engine 20 and driven by the latter at a relatively slower speed than shaft 24. It is also to be ascertained from Fig. 3 of the drawing that shaft 22 is substantially shorter than main shaft 24 and is received within a relatively narrow channel section 26 of housing 12 extending rearwardly from engine 18 to the rear vertical wall 28 of housing 12.

Self-propulsion structure 30 mounted on housing 12 and constituting the subject matter of the instant invention, includes a pair of horizontally spaced, substantially L-shaped brackets 32, each provided with a horizontal leg 34 secured to the upper wall of housing 12 adjacent respective rear drive wheels 16 by fasteners 36, while the upright segments 38 of brackets 32 are in parallel relationship perpendicular to the axes of wheels 16. An elongated channel member 40 is pivotally mounted intermediate its ends on each of the upright segments 38 of brackets 32, with bolts 42 extending through bight portions 44 of each member 40, as well as a respective segment 38 permitting members 40 to pivot about the axes of bolts 42 and serving to maintain channel members 40 in parallel relationship.

An elongated drive shaft 46, rotatably carried by channel members 40 with the outer ends of shaft 46 extending through bight portions 44 of members 40 remote from segments 38 of brackets 32, has knurled drive rolls 48 secured thereto in positions to frictionally engage the outer, circumferentially extending tread surface of corresponding drive wheels 16. Pulley 50 secured to drive shaft 46 intermediate the ends thereof is operably coupled with a horizontally rotatable pulley 52 on shaft 22 by a V-belt 54. A substantially U-shaped, longitudinally triangular cover plate 56 secured to the upper wall of housing 12 in overlying relationship to channel 26 is located in protecting relationship to belt 54 and pulley 50, as is clearly shown in Figs. 1 and 3.

Upright posts 58 secured to the upper wall of housing 12 adjacent respective channel members 40 extend upwardly through substantially triangular, lower, horizontally disposed legs 60 of channels 40 and terminate above the upper legs 62 of each member 40. The portions of legs 60 receiving respective posts 58 extend outwardly from legs 62 thereabove a sufficient distance to cause coil springs 64 surrounding posts 58 to clear upper legs 62. The upper extremities of posts 58 are externally threaded and complementally receive respective wing nuts 66 of sufficient size to bear against and compress corresponding coil springs 64 between nuts 66 and legs 60 of channel members 40 therebelow.

Guide handle structure for mower 10 includes a pair of substantially L-shaped elements 68 interconnected adjacent their uppermost ends by bracket means broadly numerated 70 and having outwardly extending handle portions 72 above bracket means 70. The lower extremities of elements 68 diverge as housing 12 of mower 10 is approached, with the lower end 74 of each element 68 being located in overlying abutting relationship to the outer face of a respective segment 38 of brackets 32, with bolt means 76 pivotally joining ends 74 of elements 68 to brackets 32 for swinging movement relative to housing 12 about aligned, horizontal axes. An elongated rod 78 spanning the distance between and connected to ends 74 of elements 68 extend through corresponding elongated slots 80 in upright segments of brackets 32 and are disposed to engage the innermost ends of channel members 40, as shown in Fig. 2, while slots 80 limit the extent of swinging of elements 68 about the axes of bolt means 76. Springs 64 engaging legs 60 of channel members 40 normally maintain elements 68 in positions with the rod 78 therebetween at the uppermost end of its path of travel within slot 80.

A lock element 82 pivotally mounted on the vertical wall 84 of cover plate 56 by bolt means 86 has an inwardly extending notch 88 therein adapted to receive rod 78 therewithin when lock element 82 is swung to one end of its path of travel.

Means for pivoting lock element 82 about the axis of bolt means 86 includes an arm 90 pivotally mounted on ear 92 of bracket means 70 and operably coupled to lock element 82 by a flexible cable 94, slidable within a tubular, flexible housing 96.

In operation, arm 90 is initially swung to its down position as shown in Fig. 4 which thereby shifts cable 94 within housing 96 to pivot lock element 82 about bolt means 86 to a location with notch 88 receiving rod 78 therewithin and maintaining the latter at the lowermost end of its path of travel within slots 80 in brackets 32. With rod 78 at the lower extremity of slots 80, channel members 40 are pivoted about the axes of bolts 42 and against the action of coil springs 64 to maintain drive rolls 48 out of contacting relationship with the outer, circumferentially extending tread surfaces of respective drive wheels 16. Viewing Fig. 2, it can be recognized that with lock element 82 engaging rod 78, the end of channel member 40 adjacent bolt means 76 is at the lowermost end of its path of travel, while the opposite ends of channel members 40 are at the upper end of their paths of travel and acting against the springs 64 compressed between respective legs 60 and wing nuts 66 on posts 58.

Engine 18 is now started which not only causes shaft 24 to be rotated at a predetermined speed but also effects rotation of output shaft 22 at a proportionally lower speed. V-belt 54 trained over pulleys 52 and 50 causes shaft 46 to be rotated and thereby drive rolls 48 but, inasmuch as the latter are maintained out of contacting relationship with drive wheels 16, mower 10 is not propelled forwardly during operation of engine 18.

When it is desired to permit mower 10 to propel itself forwardly by engine 18, arm 90 is swung upwardly with respect to ear 92, thereby shifting lock element 82 out of engagement with rod 78 and permitting coil springs 64 to swing channel members 40 about the axes of bolts 42 to positions with drive rolls 48 in frictional engagement with drive wheels 16. Because of the biasing action of coil springs 64 bearing against legs 60 of channel members 40, drive rolls 48 are maintained in frictional engagement with drive wheels 16 even during the time mower 10 is advanced by engine 18 and self-propulsion structure 30 over relatively irregular terrain. Furthermore, if there is a tendency for drive rolls 48 to slip relative to wheels 16 by virtue of the latter becoming damp, the frictional contact between drive rolls 48 and the outer surfaces of drive wheels 16 may be increased by rotating wing nuts 66 on posts 58 to thereby increase the compression of coil springs 64.

Inasmuch as coil springs 64 maintain drive rolls 48 in engagement with wheels 16, it is only necessary for the operator of mower 10 to guide the same with handles 72 and no downward or upward pressure on the handle means is required in order to maintain structure 30 in driving engagement with wheels 16. However, if it is desired to stop mower 10 for any reason whatsoever, such result may be instantly accomplished by merely swinging elements 68 upwardly by handles 72, which thereby causes rod 78 to shift downwardly within slots 80 and effect pivoting of channel members 40 about the axes of bolts 42 as rod 78 bears against the innermost ends of legs 62 on channel members 40. However, as soon as upward pressure on handles 72 is released, springs 64 again bias channel members 40 in a direction to cause drive rolls 48 to move into frictional contacting relationship with respective drive wheels 16.

The self-propulsion structure 30 is simple in construction, has a long, useful life and because of the utilization of an engine 18 having an integral gear reducer assembly 20, many of the necessary operable components for driving shaft 46 are housed within the sealed unit 20.

Having thus described the invention what is claimed as new and desired to be secured by Letters Patent is:

In a rotary blade type, power lawn mower, a housing having a front and a rear; a plurality of ground-engaging wheels, including a rear pair thereof, rotatably mounted on said housing and rendering the latter mobile; a pair of upright brackets mounted on said housing adjacent the rear thereof and spaced apart laterally of the latter, each of said brackets having an elongated slot therein, said slots being aligned; an elongated lever member for each bracket respectively pivotally mounted intermediate its ends of the corresponding bracket for swinging movement about aligned, horizontal axes below and rearwardly of said slots, forward portions of said members extending forwardly across said slots, rear portions of said members extending rearwardly alongside said rear pair of wheels and above the axes of rotation of the latter; spring means oppositely coupled with said members and said housing for yieldably biasing said rear portions of the members downwardly; a horizontal shaft rotatably carried by said rear portions of the members extending transversely of said housing above a part of each of said rear pair of wheels; a pair of driving rolls mounted on said horizontal shaft for rotation therewith and disposed to drivingly engage the corresponding ones of said rear pair of wheels when said rear portions of the members are in their downwardly biased positions; a pulley mounted on said shaft for rotation therewith; an engine on said housing; a vertical shaft rotatably mounted on said housing and operably coupled with said engine for rotation by the latter; belt means continuously operably coupling said vertical shaft with said pulley for driving the latter whenever said engine is running; a mower handle extending rearwardly from said housing and having a side element for each bracket respectively pivotally mounted adjacent its lowermost extremity on the corresponding bracket for swinging movement about aligned, horizontal axes below and forwardly of said slots; a horizontal cross rod extending laterally of said housing, above said forward portions of the members in engagement therewith, through said slots and into connection with said elements at opposite ends of said rod, said rod being shiftable with said elements when the handle is swung downwardly to swing said members for moving said rolls out of operative engagement with said rear pair of wheels; a lock element pivotally mounted on said housing for swinging movement about a horizontal axis extending laterally of the housing, said lock element having a notch therein for receiving and holding said rod against upward movement when said rod is shifted and said lock element is swung to one extremity of its path of travel; and means on said handle operably coupled with said lock element for shifting the latter to and from said extremity of its path of travel.

References Cited in the file of this patent

UNITED STATES PATENTS

| | | |
|---|---|---|
| 1,819,791 | Reed | Aug. 18, 1931 |
| 2,522,112 | Gilmour | Sept. 12, 1950 |
| 2,630,185 | Adams | Mar. 3, 1953 |
| 2,736,389 | Phelps | Feb. 28, 1956 |
| 2,824,415 | Frazier | Feb. 25, 1958 |
| 2,852,083 | Cavanaugh | Sept. 16, 1958 |